United States Patent [19]

Nitzberg et al.

[11] Patent Number: 4,827,960
[45] Date of Patent: May 9, 1989

[54] DUAL FLUID PATH BREAKAWAY SWIVEL COUPLING

[75] Inventors: Leonard R. Nitzberg, Knoxville, Tenn.; Paul D. Carmack, Tipp City, Ohio

[73] Assignee: Helix Enterprises, Inc., Knoxville, Tenn.

[21] Appl. No.: 226,227

[22] Filed: Jul. 29, 1988

Related U.S. Application Data

[63] Continuation-in-part of Ser. No. 107,947, Oct. 13, 1987, Pat. No. 4,779,638.

[51] Int. Cl.$^4$ ............................................. F16K 17/14
[52] U.S. Cl. .................................... 137/68.1; 141/59; 141/302
[58] Field of Search ................. 141/59, 302; 137/68.1, 137/599; 285/2, 272

[56] References Cited

U.S. PATENT DOCUMENTS

| | | | |
|---|---|---|---|
| 249,128 | 11/1881 | Westinghouse, Jr. | 285/68 |
| 1,118,107 | 11/1914 | Clasen | 285/1 |
| 2,452,430 | 10/1948 | Clark et al. | 285/1 |
| 4,441,533 | 4/1984 | Snyder et al. | 141/59 |
| 4,630,749 | 12/1986 | Armstrong et al. | 141/59 |

*Primary Examiner*—A. Michael Chambers
*Attorney, Agent, or Firm*—Alan Ruderman

[57] ABSTRACT

A tensile force actuated quick disconnecting coupling device for a fuel line having a vapor return has a pair of body members including interlocking elements which cooperatively couple and provide fuel and vapor passageways through the body members, and uncouple when a tensile force above a predetermined limit is interposed on the line. The interlocking elements are in the form of a mortise and tenon connection having a detent type infrangible locking member for interconnecting the elements together. The interlocking elements pivot one relative to the other so that a combination swivel joint and quick disconnecting coupling device is provided. Valving is disposed within each body member so that when the body members uncouple respective valves close the fuel passageways therein. The valving may include cylindrical stems which abut and open the fuel passageways when the body members are coupled and additionally permit pivoting of one body member relatively to the other. In one embodiment valving is also disposed with the vapor inlet passageway to close this passageway also when the body members uncouple, and this valving may include a cylindrical stem for abutting a portion of one of the fuel valves for opening the vapor passageway when the body members are uncoupled.

27 Claims, 2 Drawing Sheets

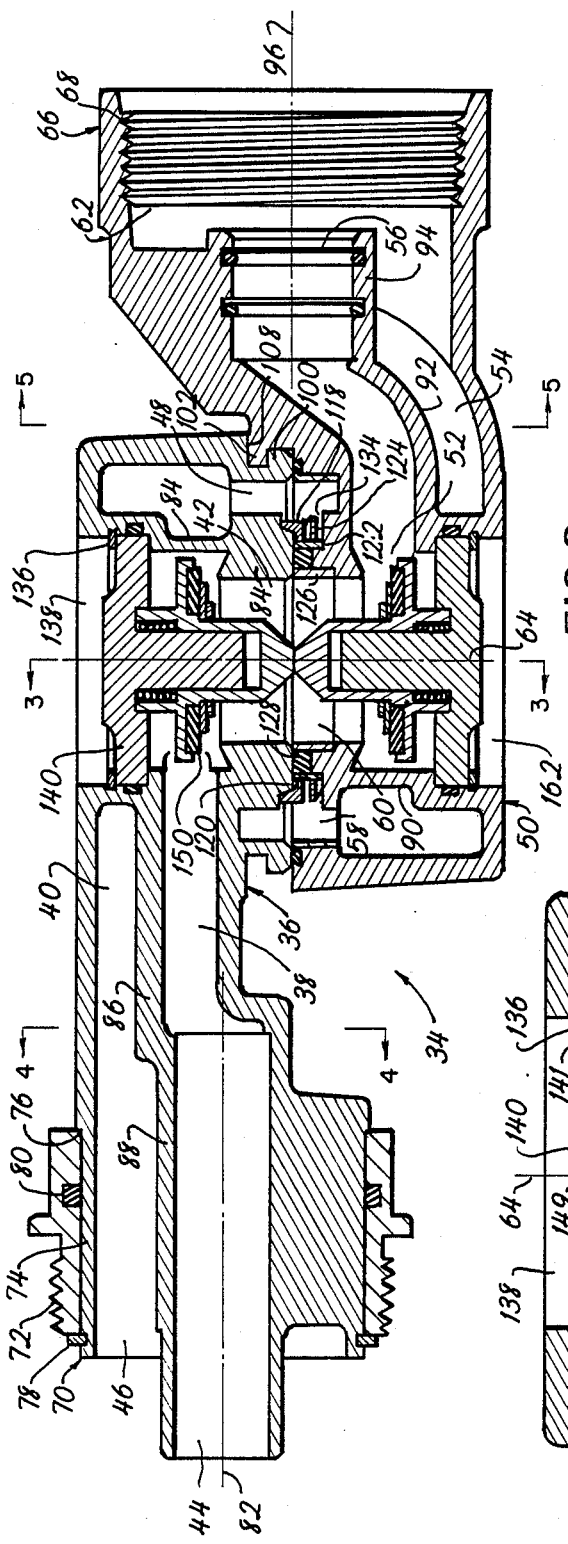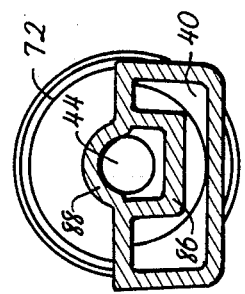
FIG.4
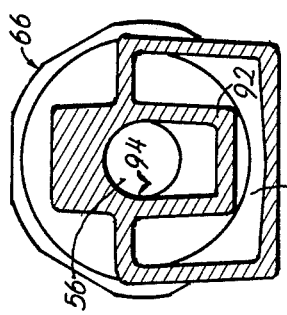
FIG.5
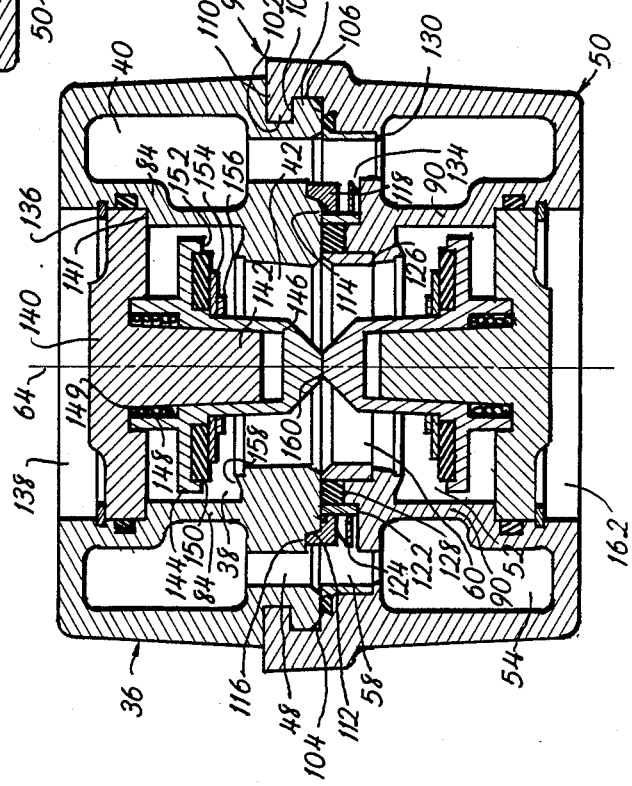
FIG. 3
FIG.2

DUAL FLUID PATH BREAKAWAY SWIVEL COUPLING

REFERENCE TO RELATED APPLICATIONS

This application is a continuation-in-part of copending U.S. application Ser. No. 07/107,947, filed Oct. 13, 1987, now U.S. Pat. No. 4,779,638, issued 10/25/88.

BACKGROUND OF THE INVENTION

This invention relates to a dual fluid swivel joint connector having a quick disconnectable coupling for uncoupling and shutting flow of at least one of the fluids therethrough, and more particularly to a swivel joint connector for mounting in a liquid fuel supply line of a fuel dispensing station having a vapor return line, the swivel joint permitting a dispensing nozzle to pivot relative to the fuel and vapor lines or permitting a first section of the lines to pivot relative to another section, and having detachable means which quickly decouples to shut flow communication of at least the fuel at the joint when the tensile load at the joint is above a predetermined level. The invention is additionally directed to a detachable coupling wherein the tensile force due to a pulling on the line, and the hydrostatic forces of the fuel within the coupling are resisted independently and are not cumulative in the coupling, whereby the uncoupling occurs solely as a result of excessive tensile load.

It is known in the fuel dispensing art to include a swivel connector at the dispenser/hose interface so that twisting loads applied to the dispenser are not transmitted to the hose resulting in twisting thereof. Such swivels merely permit the dispenser, such as a fuel dispensing nozzle, to be pivoted about one or more axes relative to the axis of the hose, the swivel permitting flow communication means between the hose and the dispensing device.

Additionally, it is known to utilize quick disconnect or breakaway couplings in the fuel line spaced from the dispenser so that if a vehicle is driven away from the fuel dispensing station before the dispensing nozzle is removed from the filler neck of the vehicle, an uncoupling will result, shutting the flow of fuel and preventing the volatile fuel to be spilled due to either a dislodging of the moorings of the fuel dispensing station, breakage of the hose, or other failure of the fuel dispensing system. The prior art has proposed a number of decouplers which are actuated by a tensile force in the line. In our aforesaid copending application serial No. 07/107,947, the problems and deficiencies of the prior art decoupler units are described and combination swivel joint and quick disconnect coupling devices are disclosed and claimed, the devices having coupling means between first and second body members which swivel relatively to one another and the coupling means acting normally to connect the body members in flow communication and for decoupling when an external tensile force above a predetermined level is applied to the fuel line, and valving acting for shutting flow communication when the body members are decoupled. These coupling devices also included devices having means for resisting the hydrostatically generated forces of the fuel and for resisting the spike line pressure shock forces resulting when the nozzle is snapped shut independently of the means for resisting the tensile forces resulting from line pull so that the hydrostatic forces, the spike pressure forces and the tensile forces would not be cumulative as in the prior art.

However, certain fuel dispensing stations may include, and in certain jurisdictions are required to include, a vapor return system for venting or drawing off the vapors while fuel is dispensed and return the vapors to the storage tank. This prevents the combustible vapors from being discharged into the atmosphere so as to protect against fire hazards and environmental contamination. In these systems the vapor flows in a counter-flow direction relative to that of the fuel, and the fuel conduit, including the nozzle, has two separate concentric or coaxial passageways, one for the fuel being pumped to the nozzle and the other for the vapor being returned to the storage tank. Although various couplings such as disclosed in U.S. Pat. Nos. 3,171,448; 3,211,178 and 3,513,887 have been suggested in the prior art for use with dual flow path systems, the prior art has not proposed apparatus for coupling portions of such dual passageway fuel lines together for swiveling of the portions relatively to one another and for uncoupling when an excessive tensile force is exerted on the line, and it is clear that the need for such apparatus remains.

SUMMARY OF THE INVENTION

Consequently, it is a primary object of the present invention to provide a swivel joint connector having a quick disconnectable coupling for uncoupling and shutting the flow of at least one fluid through a dual flow path fluid line when the tensile force on the line is above a predetermined level.

It is another object of the present invention to provide a connector for a fuel-vapor dual flow path fuel line having a quick disconnectable coupling device for uncoupling and shutting at least the fuel flow through the line when the tensile force due to a pull on the line is above a predetermined level, the device having means for resisting the hydrostatically generated forces of the fuel independently of means for resisting the tensile forces resulting from line pull such that the fuel generating forces and the tensile forces are not cumulative.

It is a further object of the present invention to provide a swivel joint connector for mounting in a coaxial path fluid supply line of a fuel dispensing station the fluid flowing in one path and counter-flowing vapor in the other path, the connector having detachable means for uncoupling when the tensile load at the joint is above a predetermined level and having means for shutting flow through at least the fuel path.

It is a still further object of the present invention to provide a combination swivel joint quick disconnect coupling device for a dual path fuel supply and vapor return line of a fuel dispensing station wherein the device may be mounted anywhere in the line including adjacent the fuel dispensing nozzle and uncouple when the tensile force on the line is above a predetermined level.

It is yet a still further object of the present invention to provide a swivel joint connector for a fuel supply vapor return dual path line having a quick disconnectable coupling device for uncoupling and shutting flow of at least the fluid through the line when the tensile force due to a pull on the line is above a predetermined level, the device having means for resisting the hydrostatically generated forces of the fuel independently of means for resisting the tensile forces resulting from line pull such that the fuel generating forces and the tensile forces are not cumulative.

Accordingly, the present invention applies the principles of the invention disclosed in our aforesaid U.S. patent application Ser. No. 07/107,947 to a dual fluid path system for use with coaxial fuel lines having a counter-flow vapor return. Thus, the present invention provides in a dual flow path fuel line having a fuel supply path and a vapr return path, a combination swivel valve and quick disconnect or breakaway coupling device, the device having coupling means between first and second body members which swivel or rotatably pivot relatively to one another, the body members having separate fuel and vapor paths, the coupling means acting to connect the first and second body members together in flow communication with each other so that the fluids, both fuel and vapor, may normally flow through the body members, the coupling having interconnectable means for decoupling the body members when an external tensile force applied to the fluid line is above a predetermined level, and valve means for shutting flow communication of at least the fuel between the body members when they are decoupled.

The coupling means may include recouplable infrangible or replaceable frangible detent means which in either case normally secures interlockable portions of the body members together and permits them to separate when the predetermined external load exerted on the line is exceeded. The infrangible detent means may comprise biased detent elements forced out of normally seated dispositions by the action of the exceeded tensile load, while the infrangible means may merely be a breakable member for permitting separation of the body members.

The body members slidably mate with the detent means acting to releasably secure them together, the slidable mating preferably being through an interconnecting joint such as a dado joint including interlocking members such as tongue and groove or tenon and mortise elements, the sliding plane being substantially aligned with the direction of the externally impressed tensile force vector.

Another aspect of the invention is the provision of coupling such disconnectable body members, whether or not the mating is by means of a swivel joint, such that the direction in which they separate is disposed at an inclination to the direction of the fluid or hydrostatically generated forces, the inclination preferably being substantially normal, and additionally the interconnecting joint is disposed such that the coupling resists the hydrostatic forces so that the hydrostatically generated forces do not affect the decoupling of the body members which thereby decouples only as a result of the externally presented tensile forces. Preferably such joint is a swivel joint.

An additional aspect of the present invention is the provision of valve means in a breakaway coupling as aforesaid wherein both the fuel and the vapor flow is shut when the body members uncouple so that minimum vapor escapes into the atmosphere. Although the amount of vapor which would escape without this feature may be of small significance, this aspect of the invention would ensure elimination of all but a fractional amount.

BRIEF DESCRIPTION OF THE DRAWINGS

The particular features and advantages of the invention as well as other objects will become apparent from the following description taken in connection with the accompanying drawings, in which:

FIG. 2 is a vertical cross-sectional view taken substantially through the longitudinal center of a first embodiment of the detachable swivel connector disclosed in FIG. 1;

FIG. 3 is a vertical cross-sectional view taken substantially along line 3—3 of FIG. 2;

FIG. 4 is a cross sectional view taken substantially along line 4—4 of FIG. 2;

FIG. 5 is a cross sectional view taken substantially along line 5—5 of FIG. 2.

DESCRIPTION OF THE PREFERRED EMBODIMENT

Figure 1:
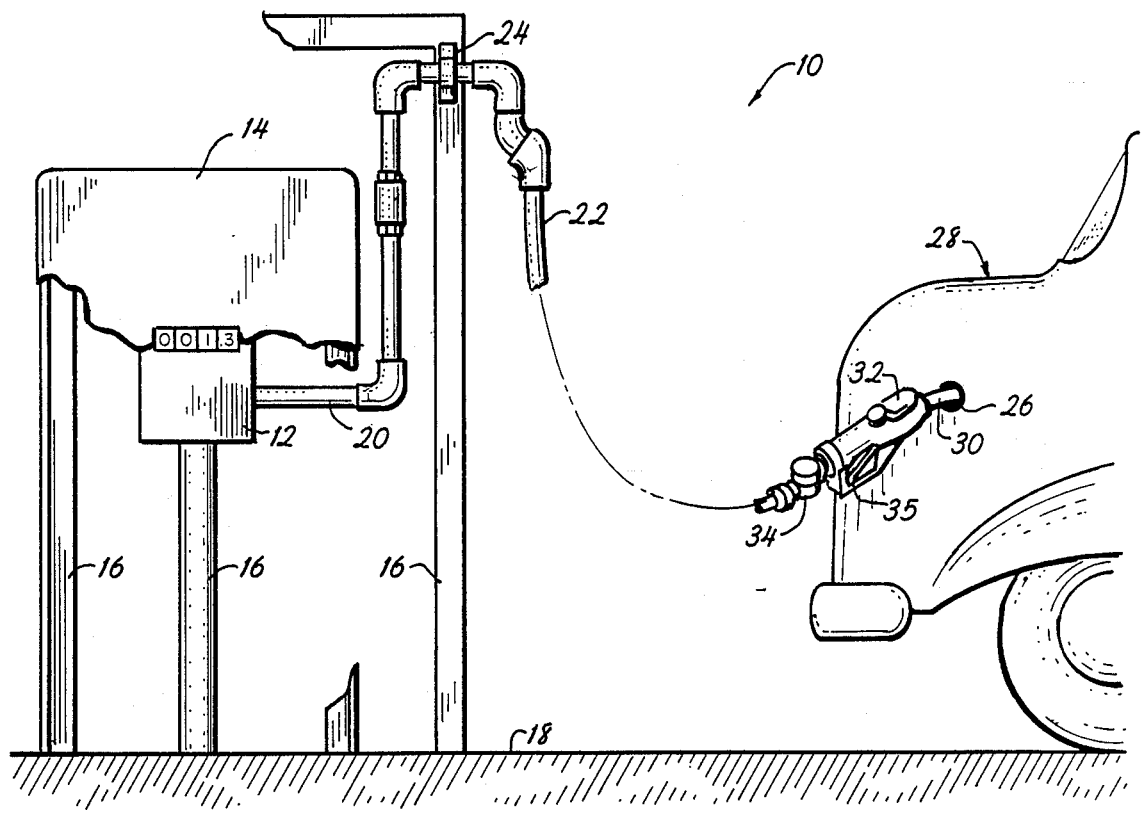
FIG. 1 is an elevational view of a portion of an automobile at a fuel dispensing station illustrating fuel being dispensed into the automobile from pumping apparatus having a fuel delivery line incorporating a detachable swivel connector constructed in accordance with the principles of the present invention.

Referring now to the drawings, a disconnectable coupling according to the present invention may be utilized in connection with the fuel dispensing facilities of various types especially those fuel dispensing stations which dispense gasoline and diesel fuel to the public, and which have dual fluid path coaxial fuel lines wherein the fuel flows through one conduit, generally the central conduit, and the vapor is returned through the other, generally outer conduit. Other dispensing facilities, such as those located, for example, on farms, industrial plants, mines etc., may also be facilities where the apparatus may be utilized if fuel and counter-flowing vapor systems are provided. However, for disclosure purposes the present invention will be described in conjunction with fuel dispensing stations located at service stations. Thus, as illustrated in FIG. 1 a dispensing station generally indicated at 10 includes measuring apparatus 12 adapted to receive and measure pressurized fluid fuel, such as gasoline and fuel oil, pumped from a remotely located storage tank through underground piping (not illustrated), the pumping equipment being adapted to be manually actuated by an operator using the facility. The measuring equipment is generally mounted within a cabinet 14 or the like secured to structural framework such as members 16 anchored by conventional means to an island on which the dispensing station is supported or to the ground 18.

Metered fuel exits the measuring equipment after being pumped thereto and from there conventionally flows through piping generally indicated at 20 comprising various conventional piping couplings, nipples, fittings and other conventional connecting members which convey the fuel from the measuring equipment to a flexible hose 22, all of which have coaxial inner and outer fluid conduits. Adjacent the connection with the hose, and intermediate that location and the measuring equipment, the piping 20 is anchored by conventional anchoring means 24 to a structural support, which may be part of the structural framework 16. The anchoring means 24 secures the piping and resists the external loads which may be placed on the various components to thereby resist damage to those components and the measuring apparatus 12. The flexible hose 22 is of a conventional re-enforced coaxial conduit construction as approved by the appropriate regulatory bodies, and may be of any convenient size and length to permit an operator to easily reach the fuel tank inlet 26 of a vehicle 28 for insertion therein of the spout 30 at the end of a dispensing nozzle 32, the nozzle also having inner and outer fixed conduits which are connected in flow communication with the corresponding conduits of the hose 22 either directly or by means of a swivel connector, which preferably may be a detachable swivel connector 34 constructed in accordance with the principles of the present invention. Conventionally, the nozzle includes valving in at least the fuel passageway in the body thereof, the valving being controlled by an adjustment trigger 35 biased to close the valving and operable to open the flow passageways upon depression or squeezing by the operator.

Under normal conditions, a vehicle operator will drive his or her vehicle 28 adjacent the fuel dispensing station 10, and then either an attendant or the operator will remove the nozzle 32 from a storage location on the cabinet 14, turn on the pumping equipment, insert the nozzle spout 30 into the inlet to the vehicle fuel tank, and squeeze the trigger 35 to dispense the fuel. Any vapor in the fuel will be simultaneously drawn off and returned by the pumping equipment to the storage tank. When the dispensing operation is completed, the individual is expected to remove the nozzle spout from the fuel tank inlet, turn off the pumping equipment and replace the nozzle on the cabinet. After paying for the fuel received, the vehicle operator will drive the vehicle from the premises. Occasionally, a vehicle may be driven from the proximity of the dispensing station 10 without first removing the nozzle spout 30 from the fuel tank inlet 26. This may occur for a number of reasons, and is not necessarily limited to individual operators pumping their own gas, but could occur as a result of a driver of a large truck not being able to see the station attendant and believing the fueling process to be completed. When this occurs forces are generated at the nozzle which may dislodge and damage the measuring equipment 12, the forces generated at the nozzle being tensile forces which are transmitted through the hose 22 to the piping and resisted by the anchoring means 24. However, when such forces exceed that for which the anchoring means is capable of withstanding, damage to the measuring equipment 22 as well as the various components of the piping may result. Additionally, when such damage occurs the highly combustible fuel may be spilled resulting in a potential fire hazard and additional environmental hazards.

As pointed out in our aforesaid copending patent application, the prior art has recognized this problem at least in regard to single fluid path systems and has endeavored to provide solutions thereto. However, the decouplers of the prior art as heretofore described have had deficiencies which have been solved by the invention in our aforesaid patent application in regard to such single fluid path systems. Accordingly, a significant aspect of the present invention is a provision of a combination swivel joint and quick disconnect device 34, which may hereinafter be referred to as a "dual flow path detachable swivel device" which is applicable to a fuel-vapor dual flow path coaxial system. The detachable swivel device may be interposed between two conduit sections and secured in flow communication therewith. For example, the dual flow path detachable swivel device 34 may be disposed between the hose 22 and the nozzle 32 thereby serving as a detachable and flexible nozzle swivel, or alternatively it may be interposed between various sections of the hose or between the piping and the hose to thereby serve as a detachable and flexible hose swivel.

As illustrated in FIGS. 2 and 3, the preferred form of the dual flow path detachable swivel device 34 comprises a first body member 36 defining first and second separated fluid passageways 38, 40 therein, the passageway 38 having an inlet 42 and an outlet 44, while the passageway 40 has an inlet 46 and an outlet 48. The detachable swivel additionally includes a second body member 50 defining first and second separated fluid passageways 52, 54 therein which communicates fluid from inlets 56, 58 to outlets 60, 62 respectively.

As hereinafter described the inlet 42 of the body member 36 is mounted in flow communication with the outlet 60 of the body 50, and the inlet 58 of the body member 50 is mounted in flow communication with the outlet 48 of the body member 36, the coupling of the body members being by means of a pivotable connection such that the body members 36, 50 may swivel or rotate relatively to each other about an axis of rotation 64. In the preferred embodiment of the invention fuel flows from the body member 50 to the body member 36 while the vapor flows from the body member 36 to the body member 50. Thus, fuel flows through the passageways 38 and 52 while vapor flows in the opposite or counter-flow direction through the passageways 46 and 54 when the body members are coupled together and fuel is being pumped. Therefore, the fuel inlet end 66 of the body member 50 has a female end and is adapted to be connected by conventional means such as internal threads 68 in flow communication with a coaxial conduit such as a coupling (not illustrated) which is connected to the hose 22, while the fuel outlet end 70 of the body member 36 has a male coupling in the form of an externally threaded member 72 mounted thereon for communicating fuel to the nozzle 32. This latter connection is preferably by means of a second swivel joint wherein the member 72 has an internal annulus which is rotatably received on the surface of a cylindrical portion 74 of the fuel outlet end 70 of the body member 36. A step 76 formed on the cylindrical portion 74 acts as an axial stop for one end of the coupling member 72 while a retaining ring 78 acts as an axial stop for the other end. A fluid seal, such as an "O" ring 80 seals against leakage of vapor as the coupling member 72 and the body member 36 swivel or rotate relatively to each other about the longitudinal axis 82 of the coupling 72. Accordingly, the inlet end 66 of the body member 50 and the nozzle (or other member which is connected to the coupling 72 at the fuel outlet of the body member 36) may revolve in two planes relatively to each other about the respective axes of rotation 64 and 82, these axes being inclined relative to each other, and in the preferred embodiment are substantially normal to each other.

The body members 36 and 50 are formed with wall members for maintaining the respective fuel and vapor passageways separated and independent of each other. Thus, for example, the body member 36 includes a wall 84 which has an arcuate configuration separating the fuel inlet 42 from the vapor outlet 48 and which is diverted to form a straight portion 86 as it extends toward the outer end 70. The wall 84 forms the vapor passageway 40 into a horse shoe shaped configuration about the fuel inlet 42 and the axis 64, the vapor passageway 40 expanding or opening the further it extends from the body member 50. As the portion 86 of this wall extends toward the fuel outlet end 70 it is formed, as illustrated in FIG. 4, into a cylindrical portion 88 having its axis common with the axis 82 of the coupling 72. Thus, both the fuel and vapor passageways have cylindrical cross sectional configurations at the fuel outlet end 70 for attachment to the nozzle 32. The body member 50 is similarly formed and includes the wall 90 having an arcuate configuration where it interfaces with the body member 36, the wall 90 separating the fuel outlet 60 from the vapor inlet 58 and forming the vapor passageway into a horse shoe shape about the fuel outlet 60 and the axis 64. The wall 90 as it extends toward the fuel inlet end 66 of the body member 50, as illustrated in FIG. 5, also is diverted to form a straight portion 92 and thereafter is formed into a cylindrical portion 94 having an axis 96 concentric with the axis of the threaded portion of the body member 50 so that both the fuel inlet 56 and the vapor outlet 62 may be attached to a conventional hose coupling as aforesaid.

In order to couple the first and second body members 36, 50 together in flow communication for both the fuel and the vapor and to uncouple then when an extraneous force in excess of a predetermined level is applied so as to terminate flow communication, interconnectable means generally indicated in FIG. 3 at 98 is provided, such means permitting the body members to rotate relative to each other about the axis 64 when coupled and to forcibly uncouple by sliding apart due to the extraneous tensile force being applied between the coupling member 72 and the body member 50 along a line of action with respect to the axis 82 and the axis 96 of the fuel inlet end 66. The interconnectable means 98 comprises interlocking members 100 and 102 formed on the first and second body members 36, 50 respectively. These interlocking members are constructed in a mortise and tenon fashion in the sense that member 100 is received within a dado slot 104 formed in step fashion between the member 102 and a surface 106 of the body member 50, spaced from the member 102, the member 100 including a surface 108 spaced from a ledge 110 formed on the body member 6, and the member 102 being received within the space or groove between the surface 108 and the ledge 110. The interlocking member 102 is an arcuate substantially semi-circular segment formed about the axis 60 and the fuel outlet 60 and vapor inlet 58 of the body member 50. The interlocking member 100 is an annular segment formed about the fuel inlet 42 and vapor outlet 48 in the body member 36, the center of the annulus being the axis 64 when the first and second body members are coupled. The interlocking members 100 and 102 thus have corresponding surfaces which interface together when the first and second body members are slidably juxtaposed into coupling engagement, and may rotate relative to one another when so coupled.

As best illustrated in FIG. 3 the arcuate wall 84 of the body member 36 has a conically tapered form 112 adjacent the vapor outlet opening 48, the taper being from the top edge 114 of the wall 84 toward the vapor passageway but spaced therefrom so that a shoulder 116 is formed on the wall 84 spaced from the top edge 114. When the members 100 and 102 are joined, the conically tapered portion of the wall 84 interfaces with a correspondingly tapered internal portion of an annular detent ring 118 which is positioned on a peripheral lip 120 of an annular retaining member 122 and urged into engagement with the tapered form 112 by means of a preloaded biasing wave spring 124. The detent ring 118, the detent retaining member 122 and the spring 124 are received within an annular recess 134 formed in the body member 50 and disposed about an annular insert 126. The insert 126 is disposed within a seat in the fuel outlet passageway 60 of the body member 50, a quad ring seal 128 being positioned between the insert 126 and the detent retaining member 122. When so held, the member 100, and thus the body member 36, is retained from moving relative to the member 102 in the direction of disengagement, i.e., the axial direction, while the conically tapered form 112 and the detent ring 118 may rotate within the cooperating surfaces of the lip 120 and upstanding wall of the detent retaining member 122, the detent ring 118 and the detent retainer 122 acting as bearing surfaces for such rotation. Preferably the angular taper of the wall 84 forming the tapered form and the tapered internal portion of the detent ring 118 are each in the order of approximately 18° to 30° with respect to the axis 64. Thus, an infrangible release is provided by the cooperation of the interlocking members and the detent ring, the release acting to uncouple the body members 36 and 50 upon the application of a tensile load in excess of a predetermined level in the direction of disengagement wherein the component of the tensile force acting at the angular disposition of the taper will result in the detent ring disengaging from the tapered form above that predetermined level. The quad ring seal 128 prevents leakage between the vapor passageways and the liquid passageways as the body members 36 and 50 rotate relative to one another, and one or more fluid seals of conventional design such as "O" ring 130 precludes leakage from the vapor passageway externally of the body members during such relative rotation, a "O" ring annular retaining member 132 having a small peripheral lip acting to hold the ring 130 within a groove formed in the body member 50.

When a load beyond that for which a coupling is designed is exerted on the fuel line, the resolved forces generated at the inclined coacting tapered surfaces of the wall 84 and the detent ring 118 produced a force component in a direction substantially parallel to the axis 64. This force is resisted by the friction between the wall 84 and the detent ring, by the friction between the detent ring and the retaining member 122 and by the bias force of the spring 124. When the cumulative total of the resisting forces is exceeded, the detent ring 118 is forced into the annular recess 134 formed in the body member 50 adjacent the vapor outlet 58 within which the spring 124 is normally positioned, and away from the wall 84 of the body member 36. This thereby frees the interlocking members 100, 102 to disengage from one another thereby permitting the interlocking members to move from axial alignment from each other and separate so that the body members 36 and 50 uncouple. Thus, if, for example, the vehicle 28 drives away from the fuel dispensing station with the nozzle spout 30 within the inlet 25 of its fuel tank, the tensile force generated on the fuel line will exceed the predetermined level and the body members 36 and 50 will separated.

The infrangible release provided may subsequently be re-engaged to again couple the body members 36 and 50. The recoupling may occur by depressing the detent ring 118 into the recess 134 in the body member 50 against the action of the spring 124, and thereafter reinserting the detent retaining member 122 while the members are inverted with respect to FIG. . 2. Thereafter the member 100 may be inserted into the dado slot 104 until the members 100 and 102 again interlock, at which time the detent ring 118 is again forcibly urged into contact with the tapered form of the wall 84 and the tapered portions are again seated.

Valving means is provided in each of the body members 36, 50, which valving means are disposed to maintain the fuel inlet 42 of the body member 36 and the fuel outlet 60 of the body member 50 in flow communication with each other when the body members are coupled together, yet close their respective passageways when the body members are uncoupled. Thus, an annular retaining ring 136 is disposed in a cavity 138 in the body member 36 for postioning a valve cap 140 therein, the cap being seated against a shoulder 141 formed in the cavity. The cap 140 includes a guide spindle 142 extending axially along the axis 64 toward the fuel inlet 42. A check valve 144 having an integral axially extending hollow stem 146 receives the spindle 142 and is moveable along the axis 64 guided by the spindle 142, while a coil spring 148 disposed about the spindle 142 is received within a recess 149 in the lower part of the check valve 144 and acts against a surface therein to bias the check valve 144 toward the inlet 142. An annular check valve seat 150 is disposed about a recessed rim 152 of the check valve 144 and is retained thereon by means of a retaining member 154 and a retaining ring 156. When the body member 36 is disconnected from the body member 50 the valve seat 150 is forced into cooperation with an annular seat 158 within the cavity 138 disposed about the inlet 42 to close the inlet 42, and when this occurs the free end 160 of the valve stem 146 projects out of the inlet 42. An identical valving structure is disposed within a cavity 162 of the second body member 50 for closing the fuel outlet 60 therein when the second body member 50 is uncoupled from the first body member 36, and the reference numbers in regard thereto are omitted for purposes of clarity. When the members are coupled together the free ends 160 of each of the respective valve stems 146 are forcibly engaged to overcome the bias of the respective spring 148 and open the flow path through the fuel inlet and outlet 42, 60 respectively.

As aforesaid, the hydrostatically produced forces comprising the internal pressure of the fuel and the shock-line forces are directed at an inclination, and in the preferred embodiment substantially perpendicular, to the direction of the tensile force due to a pull on the hose since the hydrostatically produced forces are generated in a direction parallel to the axis 64 as the fuel flows between the outlet 60 of the body member 50 into the inlet 42 of the body member 36. This direction of flow through the coupling between the first and second body members tends to prevent disengagement of the disconnectable means 98. In other words, the interconnectable means resists the hydrostatically generated forces and only disengage or uncouple by the action of the excessive tensile forces transmitted when an excessive pull is exerted on the coaxial line.

The coupling illustrated in the preferred embodiment of FIGS. 2-5 shuts the fuel flowing through the fuel passageways 38 and 52 in the body members 36 and 50 respectively when the body members uncouple, but does not shut off the vapor passageways 40 and 54. Although the amount of vapor which would vent to the atmosphere with this construction is minimal, it may be desirable to also shut the vapor passageway, or at least the passageway to the body member 50 from the remote fuel tank when the body members uncouple. Thus, a second embodiment of the coupling is illustrated in FIG. 6 wherein a vapor shut-off system is combined with the fuel shut-off system.

Figure 6:
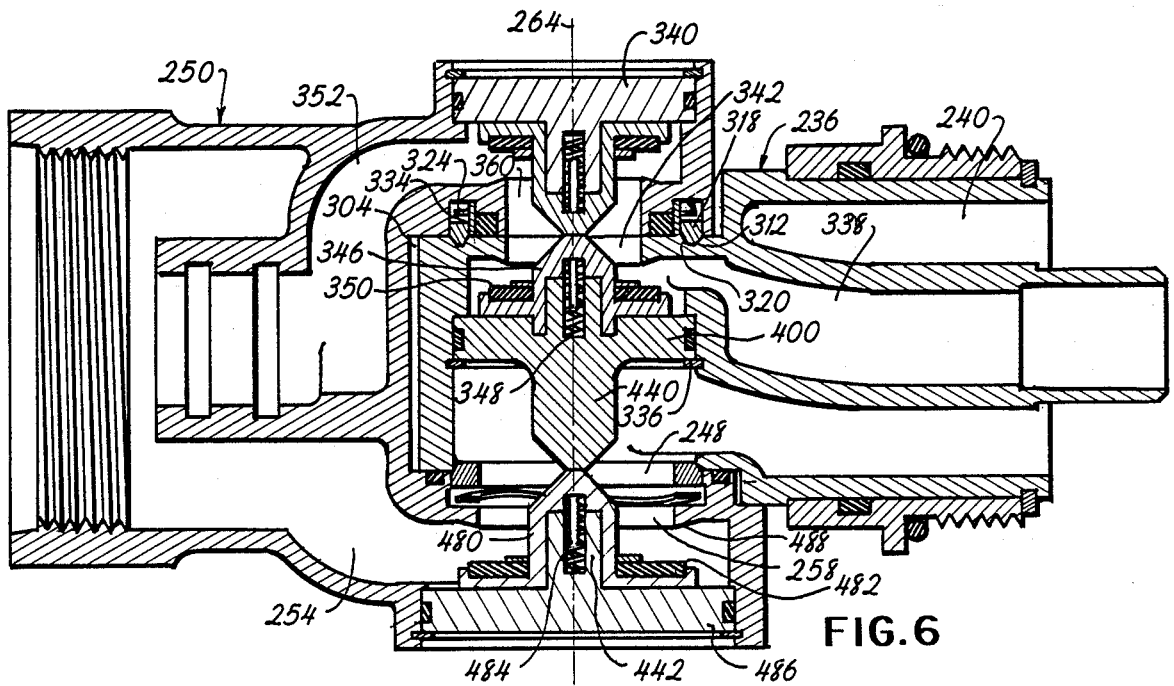
FIG. 6 is a view similar to FIG. 2 but of a second embodiment of the swivel connector, this embodiment having valving for shutting flow of the fuel and all but a minimum amount of the vapor.

As illustrated in FIG. 6, the first body member 236 is received within an enlarged dado slot 304 formed within the second body member 250. An annular recess 334 in the dado slot of the body member 250 receives an annular detent ring 318 having a tapered surface 320 which is forcibly urged into a similarly tapered annular groove 312 in the body member 236 by a wave spring 324 to secure the body members together when coupled in a manner similar to that in the first embodiment. The fuel passageway 338 in the body member 236 receives fuel from the fuel passageway 352 in the body member 250 via the fuel inlet 342 and fuel outlet 360 in the body members 236 and 250 respectively. The vapor flows from the vapor passageway 240 through a vapor outlet 248 in the body member 236 to a vapor inlet 258 and the vapor passageway 254 in the body member 250 in a manner similar to the coupling in the first embodiment. However, here although the valving means for the fuel inlet side of the fuel path, i.e., in the body member 250, is substantially identical as that illustrated in FIGS. 2 and 3, the valving at the fuel outlet side of the first body member 236 preferably has a valve cap 400 having an additional spindle 440 extending axially along the axis 264 in a direction away from the spindle 346 in the fuel path. As illustrated, the valve cap 400 may be retained within the vapor passageway 240 by a retaining member 336 in the same manner as the valve cap 340 in the fuel path of the body member 250 which is substantially the same as in the first embodiment. If, however, the vapor path in the body member 236 is also to be closed, the valve cap 400 may be moveable toward the vapor outlet 248 by means of the spring 348 which normally urges the spindle 346 and the check valve seat 350 toward closing relationship with the fuel inlet 342 as in the first embodiment. As illustrated, however, the spindle 440 of the valve cap 400 is fixed by the retaining ring 336 and when the body members are coupled engages the stem 480 of an additional valving means disposed adjacent the vapor inlet 258 of the second body member 250, the spindle 480 being constructed in substantially the same manner as the spindle 346 for the fuel path.

When the body members 236 and 250 uncouple, not only do the valves in the fuel paths shut the flow therein in a manner similar to that in the first embodiment, but the stem 480 and thus a valve seat 482 disposed thereon move axially along the axis 264 to close the vapor inlet 258. A spring 484 within a recess in a stem 442 extending from the vapor valve cap 486 urges the valve seat 482 to abut and seal with an annular seat 488 about the vapor inlet 258. When the body members 238 and 250 are couple, the bias of the spring 484 is overcome by the end of the spindle 440 which abuts the end of the spindle 480, but when the members uncouple, the spring 484 forces the valve seat 482 to close the vapor inlet 258. This shuts off the vapor passageway from the fuel tank so that no vapor may escape from the fuel tank to the atmosphere. However, the minute amount of vapor from the fuel nozzle will vent to atmosphere, unless the valve cap 440 is moveable with respect to the body member 236 to close the vapor outlet 248 as aforesaid.

In all other respects the embodiment of FIG. 6 is constructed to and functions in a manner substantially identical to that in the first embodiment illustrated in FIGS. 2-5.

Although the present invention is described with regard to infrangible locking means for releasably locking the coupled body members together, it should be clear that a frangible or breakaway connection may readily be provided, and the present invention does not exclude such a construction. Additionally, although the interlocking member 102 as described has a semi-circular configuration and is adapted to accept the correspondingly curved but fully circular interlocking member 100 of the first body member 36, alternate forms such as the reverse thereof are not excluded by the present invention. These and numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifiations which do not depart from the spirit of the invention are intended to be included within the scope of the appended claims.

Having thus set forth the nature of the invention, what is claimed herein is:

1. In a fuel dispensing system including a liquid fuel dispensing station for receiving fuel from a remote location and supplying fuel to a supply conduit and simultaneously receiving vapor from the supply conduit and returning the vapor to said remote location, a flexible line having a fuel path and a vapor path operatively connected in flow communication to said conduit, and a nozzle including operator actuating means operatively connected to said line for receiving fuel and returning vapor, a detachable safety device connected in said line intermediate said nozzle and said conduit for coupling portions of said line together while maintaining the fuel and vapor in separate flow paths and for uncoupling when an excessive tensile force is exerted externally on said line, said device comprising first and second body members, each of said body members having a fuel passageway and a separate vapor passageway extending therethrough, each of said passageways having an inlet and an outlet, coupling means interconnecting said first and second body members together for pivotable movement about a pivot axis relatively to one another with the fuel outlet of a first of said body members in flow communication with the fuel inlet of the second of said body members and with the vapor inlet of the first body member in flow communication with the vapor outlet of the second body member to permit fuel and vapor to flow through the respective passageway when said body members are coupled, locking means for locking said body members together when coupled and for unlocking said members when an external tensile force above a predetermined limit is applied to said line to permit uncoupling of said body members, and valve means in at least the fuel passageway of each body member for shutting flow communication of at least the fuel between said body members when uncoupled.

2. In a fuel dispensing system as recited in claim 1, wherein said coupling means comprises a first interlocking member disposed about the fuel outlet and vapor inlet of said first body member and a second interlocking member disposed about the fuel inlet and vapor outlet of said second body member, an arcuate mortise slot formed in one of said interlocking members and a correspondingly configured arcuate tenon defined in the other of said interlocking members, said tenon being cooperatively received within said mortise when said body members are uncoupled.

3. In a fuel dispensing system as recited in claim 2, wherein said locking means comprises an annular recess formed in the body member in which said mortise is defined, an annular wall in the body member having said tenon, an annular detent ring disposed within said recess and positioned on said wall, and biasing means within said recess for urging said ring into engagement with said wall at an angle inclined relatively to said tensile force.

4. In a fuel dispensing system as recited in claim 3, wherein said ring and said wall have cooperating annular surfaces, and said surfaces are inclined relatively to said pivot axis.

5. In a fuel dispensing system as recited in claim 4, wherein said wall is disposed intermediate the fuel and vapor passageways in said body member having said tenon.

6. In a fuel dispensing system as recited in claim 1, wherein said valve means comprises a valve disposed in said fuel outlet of said first body member and a valve disposed in said fuel inlet of said second body member, biasing means normally urging each valve to close the respective inlet and outlet, abutment means associated with each valve for protruding through the respective outlet and inlet when said body members are uncoupled and for forcibly abutting one another when said body members are coupled to overcome the urging of the respective biasing means to open the respective inlet and outlet.

7. In a fuel dispensing system as recited in claim 6, wherein said valve means further includes a vapor path valve disposed in at least the vapor inlet of said first body member, biasing means normally urging said vapor path valve to close said vapor inlet, abutment means associated with said vapor path valve for protruding through said vapor inlet when said body members are uncoupled, abutment means in the vapor outlet of said body member for forcibly abutting the abutment means associated with said vapor path valve when said body members are coupled to overcome the urging f the biasing means associated with said vapor path valve to open said vapor inlet and for protruding through said vapor inlet when said body members are uncoupled.

8. In a fuel dispensing system as recited in claim 1, wherein said second body member includes a coupling pivotably connected in flow communication with the fuel and vapor passageways of said second body member for rotation about an axis inclined relatively to said pivot axis.

9. In a fuel dispensing system including a liquid fuel dispensing station for receiving fuel from a remote location and supplying fuel to a supply conduit and for simultaneously receiving vapor from the supply conduit and returning the vapor in said remote location, a flexible line having separate fuel and vapor paths operatively connected in flow communication to said conduit, and a nozzle including operator actuating means operatively connected to said line for receiving fuel and returning vapor, a detachable safety device connected in said line intermediate said nozzle and said conduit for coupling portions of said line together while maintaining the fuel and vapor in separate flow paths and for uncoupling when an excessive tensile force is exerted externally on said line, said device comprising first and second body members, each of said body members having a fuel passageway and a separate vapor passageway extending therethrough, each of said passageways having an outlet and an inlet, coupling means interconnecting said first and second body members together with the fuel outlet of one of said body members in flow communication with the fuel inlet of the other of said body members and with the vapor inlet of the first body member in flow communication with the vapor outlet of the second body member to permit fuel and vapor to flow through the respective passageway when said body members are coupled, said coupling means having respective interlocking elements associated with each body member permitting sliding of said body members relatively to one another into and out of coupling engagement, said interlocking elements being disposed relatively to said fuel inlet and said fuel outlet for resisting uncoupling in the direction fuel flows through said inlet and said outlet, locking means for locking said body members together when coupled and for unlocking said memberswhen an external tensile force above a predetermined limit is applied to said line to permit uncoupling of said body members, and valve means in at least the fuel passageway of each body member for shutting flow communication of at least the fuel between said body members when uncoupled.

10. In a fuel dispensing system as recited in claim 9, wherein said coupling means comprises a first interlocking member disposed about the fuel outlet and vapor inlet of said first body member and a second interlocking member disposed about the fuel inlet and vapor outlet of said second body member, an arcuate mortise slot formed in one of said interlocking members and a correspondingly configured arcuate tenon defined in the other of said interlocking members, said tenon being cooperatively received within said mortise when said body members are uncoupled.

11. In a fuel dispensing system as recited in claim 10, wherein said locking means comprises an annular recess formed in the body member in which said mortise is defined, an annular wall in the body member having said tenon, an annular detent ring disposed within said recess and positioned on said wall, and biasing means within said recess for urging said ring into engagement with said wall at an angle inclined relatively to said tensile force.

12. In a fuel dispensing system as recited in claim 11, wherein said ring and said wall have cooperating annular surfaces, and said surfaces are inclined relatively to said pivot axis.

13. In a fuel dispensing system as recited in claim 12, wherein said wall is disposed intermediate the fuel and vapor passageways in said body member having said tenon.

14. In a fuel dispensing system as recited in claim 9, wherein said valve means comprises a valve disposed in said fuel outlet of said first body member and a valve disposed in said fuel inlet of said second body member, biasing means normally urging each valve to close the respective inlet and outlet, abutment means associated with each valve for protruding through the respective outlet and inlet when said body members are uncoupled and for forcibly abutting one another when said body members are coupled to overcome the urging of the respective biasing means to open the respective inlet and outlet.

15. In a fuel dispensing system as recited in claim 14, wherein said valve means further includes a vapor path valve disposed in at least the vapor inlet of said first body member, biasing means normally urging said vapor path valve to close said vapor inlet, abutment means associated with said vapor path valve for protruding through said vapor inlet when said body members are uncoupled, abutment means in the vapor outlet of said body member for forcibly abutting the abutment means associated with said vapor path valve when said body members are coupled to overcome the urging of the biasing means associated with said vapor path valve to open said vapor inlet and for protruding through said vapor inlet when said body members are uncoupled.

16. In a fuel dispensing system as recited in claim 15, wherein each of said abutment means has a cylindrical configuration and extends coincidentally with said pivot axis.

17. In a fuel dispensing system as recited in claim 9, wherein said second body member includes a coupling pivotably connected in flow communication with the fuel and vapor passageways of said second body member for rotation about an axis inclined relatively to said pivot axis.

18. In a fuel dispensing dispensing system including a liquid fuel dispensing station for receiving fuel from a remote location and supplying fuel to a supply conduit and for simultaneously receiving vapor from the supply conduit and returning the vapor to said remote location, a flexible line having separate fuel and vapor paths operatively connected in flow communication to said conduit, and a nozzle including operator actuating means operatively connected to said line for receiving fuel and returning vapor, a detachable safety device connected in said line intermediate said nozzle and said conduit for coupling portions of said line together while maintaining the fuel and vapor in separate fuel paths and for uncoupling when an excessive tensile force is exerted externally on saidline, said device comprising first and second body members, each of said body members having a fuel passageway and a separate vapor passageway extending therethrough, each of said passageways having an inlet and an outlet, coupling means interconnecting said first and second body members together for pivotable movement about a pivot axis relatively to one another with the fuel outlet of a first of said body members in flow communication with the fuel inlet of the second of said body members and with the vapor inlet of the first body member in flow communication with the vapor outlet of the second body member to permit fuel and vapor to flow therethrough when said body members are coupled, said coupling means having respective interlocking elements associated with each body member permitting sliding of said body members relatively to one another into and out of coupling engagement and for permitting pivotable movement relatively to one another about said pivot axis, said pivot axis being inclined relatively to the sliding direction, said interlocking elements being disposed relatively to said fuel inlet and said fuel outlet for resisting uncoupling in the direction fuel flows through said inlet and said outlet, locking means for locking said body members together when coupled and for unlocking said members when an external tensile force above a predetermined limit is applied to said line to permit uncoupling of said body members, and valve means in at least the fuel passageway of each body member for shutting flow communication of at least the fuel between said body members when uncoupled.

19. In a fuel dispensing system as recited in claim 18, wherein said coupling means comprises a first interlocking member disposed about the fuel outlet and vapor inlet of said first body member and a second interlocking member disposed about the fuel inlet and vapor outlet of said second body member, an arcuate mortise slot formed in one of said interlocking members and a correspondingly configured arcuate tenon defined in the other of said interlocking members, said tenon being cooperatively received within said mortise when said body members are uncoupled.

20. In a fuel dispensing system as recited in claim 19, wherein said locking means comprises an annular recess formed in the body member in which said mortise is defined, an annular wall in the body member having said tenon, an annular detent ring disposed within said recess and positioned on said wall, and biasing means within said recess for urging said ring into engagement with said wall at an angle inclined relatively to said tensile force.

21. In a fuel dispensing system as recited in claim 20, wherein said ring and said wall have cooperating annular surfaces, and said surfaces are inclined relatively to said pivot axis.

22. In a fuel dispensing system as recited in claim 21, wherein said wall is disposed intermediate the fuel and vapor passageways in said body member having said tenon.

23. In a fuel dispensing system as recited in claim 18, wherein said valve means comprises a valve disposed in said fuel outlet of said first body member and a valve disposed in said fuel inlet of said second body member, biasing means normally urging each valve to close the respective inlet and outlet, abutment means associated with each valve for protruding through the respective outlet and inlet when said body members are uncoupled and for forcibly abutting one another when said body members are coupled to overcome the urging of the respective biasing means to open the respective inlet and outlet.

24. In a fuel dispensing system as recited in claim 23, wherein said valve means further includes a vapor path valve disposed in at least the vapor inlet of said first body member, biasing means normally urging said vapor path valve to close said vapor inlet, abutment means associated with said vapor path valve for protruding through said vapor inlet when said body members are uncoupled, abutment means in the vapor outlet of said body member for forcibly abutting the abutment means associated with said vapor path valve when said body members are coupled to overcome the urging of the biasing means associated with said vapor path valve to open said vapor inlet and for protruding through said vapor inlet when said body members are uncoupled.

25. In a fuel dispensing system as recited in claim 24, wherein each of said abutment means has a cylindrical configuration and extends coincidentally with said pivot axis.

26. In a fuel dispensing system as recited in claim 18, wherein said second body member includes a coupling pivotably connected in flow communication with the fuel and vapor passageways of said second body member for rotation about an axis inclined relatively to said pivot axis.

27. In a fuel dispensing system as recited in claim 20, wherein said tenon has a circular circumference and said mortise slot has a semi-circular cross sectional configuration.

* * * * *